2,830,960

COBALT MOLYBDATE CATALYSTS

Charles Broomhead, Liverpool, England, assignor to Peter Spence & Sons Limited, Widnes, England No Drawing. Application August 13, 1954
Serial No. 449,790

Claims priority, application England August 19, 1953

7 Claims. (Cl. 252—465)

This invention relates to the preparation of catalysts comprising the oxides of cobalt and molybdenum, either as such or in combined form, incorporated with a support. Such catalysts are especially effective in processes for the hydrocatalytic desulphurisation of hydrocarbons, particularly petroleum hydrocarbons.

Various methods have been proposed for the preparation of such catalysts. Thus, a cobalt/molybdenum complex may be precipitated from solution and incorporated with a support, or the complex may be precipitated in the presence of a support, such as a metal oxide hydrogel for example alumina hydrogel. For example, a catalyst may be prepared by the addition of an alkaline solution of ammonium molybdate to a suspension of alumina hydrogel in cobalt nitrate solution. In any event, the precipitate must be washed to remove ammonium nitrate, resulting in the loss of costly materials. Again, a catalyst may be prepared by impregnating a support, such as granular or pelleted alumina, with separate solutions of cobalt and molybdenum salts or with a single alkaline solution of cobalt and molybdenum salts, and heating. This method involves either a two-stage impregnation or careful control of the alkalinity of the single solution to avoid precipitation of a cobalt/molybdenum complex.

The principal object of the present invention is to provide a method of catalyst production which avoids or reduces the above disadvantages and in particular avoids the production of a cobalt and molybdenum complex as a separate step in the production of the catalyst.

According to the present invention, molybdenum oxide or hydrated oxide and an organic salt of cobalt are mixed with a support, and the mixture heated to decompose the organic salt.

The support may conveniently be of alumina but for example oxides of zirconium, titanium, silicon or thorium may also be used. Moreover, mixtures of alumina with titania, zirconia or silica may also be employed as catalyst supports.

A preferred method comprises mixing molybdenum oxide or hydrated oxide and an organic salt of cobalt with alumina, and heating the mixture to a temperature within the range 450–650° C. to decompose the organic salt and to activate the alumina.

The organic cobalt salt should be of the low water solubility and should have a relatively high metal content, since salts with a relatively low metal content are undesirable economically and may furthermore yield a weak product due to excessive loss of volatile matter on calcination. For these reasons, basic organic salts rather than neutral salts may be preferred in certain cases. The preferred organic salt is cobalt formate but other organic salts such as cobalt oxalate may be used.

In a preferred method of carrying the invention into effect, cobalt formate, molybdic acid and alumina hydrogel slurry are thoroughly mixed in suitable proportions, the excess water is removed by centrifuging or filtering and the mass dried. The mass may then be calcined at a temperature within the range 450–650° C. to remove the organic residue, giving a granular catalyst, or it may be ground and pelleted before calcination.

In an alternative method of carrying the invention into effect, cobalt formate, molybdic acid and alumina powder of the requisite pelleting characteristics, are dry mixed in suitable proportions. The mixture may be wetted and extruded or pelleted in the dry form in the normal way. The pellets are then activated by calcination at a temperature within the range 450–650° C.

Example 1

25 lb. of cobalt formate and 95 lb. of molybdic acid are thoroughly mixed with 3,800 lb. of an alumina hydrogel containing 10% $Al_2O_3$. The excess water is removed from the suspension by vacuum filtration and the resulting paste is dried at a temperature of 60° to 70° C. The lump material obtained from the dryer is crushed and graded to the desired size and thereafter activated by calcination at a temperature within the range 450° to 650° C.

Example 2

5 lb. of cobalt formate and 18½ lb. of molybdic acid are thoroughly mixed with 543 lb. dried alumina hydrogel, containing 70% $Al_2O_3$. The mixture is then wetted and pellets produced by extrusion. These are dried prior to activation. Alternatively, the dried mixture is further mixed with a suitable lubricant such as aluminum stearate and converted to pellets in normal punch and die type machines.

Pellets, whether produced by extrusion or ramming in dies, are activated by calcination at a temperature within the range 450° to 650° C.

The effectiveness of catalysts prepared according to the invention in the hydrocatalytic desulphurisation of petroleum hydrocarbons will be apparent from the following examples of its use in the so-called autofining process which is described inter alia in British patent specifications Nos. 654,152, 669,536 and 669,553.

Example 3

An Iranian kerosine was autofined under the following conditions using a catalyst as prepared in Example 1.

| | |
|---|---|
| Processing period, hr | 400 |
| Temperature, °F | 780 |
| Pressure, p. s. i. g | 100 |
| Space velocity, vol./vol./hr | 5.0 |
| Recycle rate, cu. ft./brl | 2000 |
| Gas make (average), cu. ft./brl | 18 |
| Gas, mol percent $H_2$ | 91 |

The following are the inspection data of the feedstock and product:

| | Feedstock | Product |
|---|---|---|
| Yield, percent wt. on feed | 100.0 | 99.5. |
| Inspection data: | | |
| Total sulphur, percent wt | 0.180 | 0.004. |
| Sulphur removal, percent | | 98.0. |
| Mercaptan sulphur, percent wt. | 0.016 | <0.001. |
| Colour, Saybolt | +15 | +17. |
| Flash point, °F | 126 | 106. |
| Aromatics, percent wt | 16.9 | 17.8. |
| Bromine number | 2 | 2. |
| Odour | Unmerchantable | Merchantable. |
| Doctor Test | Positive | Negative. |
| Smoke point, mm | 25 | 26. |
| Burning test: | | |
| Consumption, g./hr | 20.6 | 20.1. |
| Char, mg./kg | 28 | 14. |
| Glass | Grey-brown film | Very faint grey film. |
| Specific gravity at 60° F./60° F. | 0.799 | 0.798. |
| Distillation: | | |
| I. B. P., °C | 169 | 165. |
| 2% vol. at °C | 178 | 174. |
| 10% vol. at °C | 185 | 184. |
| 50% vol. at °C | 207 | 206. |
| 90% vol. at °C | 230 | 231. |
| F. B. P., °C | 244 | 247. |

Example 4

Two samples of Iranian gas oil were autofined under the following conditions using a catalyst as prepared in Example 1.

| Sample | A | B |
|---|---|---|
| Conditions: | | |
| Processing period, hr | 200 | 200 |
| Temperature, °F | 780 | 780 |
| Pressure, p. s. i. g | 100 | 100 |
| Space velocity, vol./vol./hr | 2.0 | 2.0 |
| Recycle rate, cu. ft./brl | 2,000 | 2,000 |
| Gas make (average), cu. ft./brl | 15.1 | 5.0 |
| Gas, mol percent $H_2$ | 80 | 79.5 |

The following are the inspection data of the feedstock and product:

| | Feedstock | product | Feedstock | product |
|---|---|---|---|---|
| Yield, percent wt. on feed | 100.0 | 99.4 | 100.0 | 99.2 |
| Inspection data: | | | | |
| Sulphur, percent wt | 0.720 | 0.360 | 1.0 | 0.48 |
| Sulphur removal, percent | | 50.0 | | 52.0 |
| Mercaptan sulphur, percent wt | 0.011 | 0.001 | 0.07 | 0.002 |
| Diesel index | 60 | 60 | 55 | 56 |
| Cetane number | 54 | 54 | 54 | 54 |
| Flash point, °F | 186 | 168 | 225 | 205 |
| Pour point (upper), °F | 15 | 10 | 15 | 15 |
| Conradson carbon (10% res.), percent wt | 0.08 | 0.13 | 0.11 | 0.12 |
| Aniline point, °F | 161 | 159 | 160 | 160 |
| Copper strip at 100° C | Passes | Passes | Passes | Passes |
| Specific gravity at 60° F./60° F | 0.839 | 0.836 | 0.854 | 0.850 |
| Distillation: | | | | |
| I. B. P., °C | 208 | 185 | 237 | 198 |
| 5% vol. at °C | | | 266 | 250 |
| 10% vol. at °C | 230 | 226 | 271 | 262 |
| 50% vol. at °C | 270 | 265 | 294 | 291 |
| 90% vol. at °C | 330 | 325 | 326 | 323 |
| F. B. P., °C | 357 | 357 | 350 | 350 |

We claim:

1. A method of preparing a catalyst comprising the oxides of cobalt and molybdenum, said method comprising mixing a major proportion of alumina with a minor proportion of a catalytic agent consisting of molybdic acid and cobalt formate, and heating the resultant mixture to a temperature within the range 450° to 650° C. to decompose the cobalt formate and to activate the alumina, the proportions of alumina, molybdic acid and cobalt formate being so chosen that the product obtained by said heating contains at least 60% by weight of alumina and has a $CoO:MoO_3$ ratio by weight from 1:1 to 1:20.

2. A method of preparing a catalyst comprising the oxides of cobalt and molybdenum, said method comprising mixing a major proportion of alumina hydrogel slurry with a minor proportion of a catalytic agent consisting of cobalt formate and molybdic acid in the proportion of 1 part by weight of cobalt formate to 0.5 to 12 parts by weight of molybdic acid, removing excess water from the resultant mixture, drying the mixture and calcining the mixture within the temperature range 450° to 650° C.

3. A method of preparing a catalyst comprising the oxides of cobalt and molybdenum, said method comprising mixing a major proportion of alumina powder with a minor proportion of a catalytic agent consisting of cobalt formate and molybdic acid in the proportion of 1 part by weight of cobalt formate to 0.5 to 12 parts by weight of molybdic acid, forming the resultant mixture into pellets, and heating the pellets to a temperature within the range 450° to 650° C.

4. A method of preparing a catalyst comprising the oxides of cobalt and molybdenum, said method comprising mixing a major proportion of an oxidic carrier selected from the group consisting of alumina, zirconia, titania, silica, thoria and mixtures thereof with a minor proportion of a catalytic agent comprising a member selected from the group consisting of an oxide of molybdenum and molybdic acid and a cobalt salt selected from the group consisting of cobalt formate and cobalt oxalate and heating the resultant mixture at a temperature sufficient to decompose the cobalt salt, the proportions of oxidic carrier, and catalytic agent being so chosen that the product obtained by said heating contains at least 60% by weight of oxidic carrier and has a $$CoO:MoO_3$$

ratio by weight of from 1:1 to 1:20.

5. A method of preparing a catalyst comprising the oxides of cobalt and molybdenum, said method comprising mixing a major proportion of alumina with a minor proportion of a catalytic agent consisting of an oxide of molybdenum and cobalt formate, and heating the resultant mixture at a temperature within the range of 450°–650° C., to decompose the cobalt formate and to activate the alumina, the proportions of alumina, oxide of molybdenum and cobalt formate being so chosen that the product obtained by said heating contains at least 60% by weight of said alumina and has a $CoO:MoO_3$ ratio by weight of from 1:1 to 1:20.

6. A method of preparing a catalyst comprising the oxides of cobalt and molybdenum, said method comprising mixing a major proportion of alumina with a minor proportion of a catalytic agent consisting of an oxide of molybdenum and cobalt oxalate, and heating the resultant mixture at a temperature within the range of 450°–650° C., to decompose the cobalt oxalate and to activate the alumina, the proportions of alumina, oxide of molybdenum and cobalt oxalate being so chosen that the product obtained by said heating contains at least 60% by weight of said alumina and has a $CoO:MoO_3$ ratio by weight of from 1:1 to 1:20.

7. A method of preparing a catalyst comprising the oxides of cobalt and molybdenum, said method comprising mixing a major proportion of alumina with a minor proportion of a catalytic agent consisting of molybdic acid and cobalt oxalate, and heating the resultant mixture at a temperature within the range of 450°–650° C., to decompose the cobalt oxalate and to activate the alumina, the proportions of the alumina, molybdic acid and cobalt oxalate being so chosen that the products obtained by said heating contains at least 60% by weight of said alumina and has a $CoO:MoO_3$ ratio by weight of from 1:1 to 1:20.

References Cited in the file of this patent

UNITED STATES PATENTS

| 1,919,730 | Koenig | July 25, 1933 |
| 2,328,846 | Pitzer | Sept. 7, 1943 |
| 2,499,255 | Parker | Feb. 28, 1950 |
| 2,687,381 | Hendricks | Aug. 24, 1954 |